United States Patent
Fujii et al.

(10) Patent No.: US 8,798,889 B2
(45) Date of Patent: Aug. 5, 2014

(54) AUTOMATIC TRANSMISSION AND METHOD OF CONTROL FOR REJECTING ERRONEOUS TORQUE MEASUREMENTS

(75) Inventors: Yuji Fujii, Ann Arbor, MI (US); Bradley Dean Riedle, Northville, MI (US); Gregory Michael Pietron, Canton, MI (US); Joseph F. Kucharski, Livonia, MI (US); Diana Yanakiev, Birmingham, MI (US); Richard Reynolds Hathaway, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 722 days.

(21) Appl. No.: 12/973,229

(22) Filed: Dec. 20, 2010

(65) Prior Publication Data

US 2012/0158260 A1   Jun. 21, 2012

(51) Int. Cl.
*B60T 7/12* (2006.01)
(52) U.S. Cl.
USPC ............. 701/84; 701/51; 701/53; 701/58; 701/29.1; 701/87; 280/734; 280/735; 73/862.325; 73/862.333; 475/125
(58) Field of Classification Search
USPC ............ 701/51, 53–58, 31.6, 84, 87, 29.1; 477/106–109; 73/862.321, 862.325, 73/862.195, 826.333; 280/734–735
See application file for complete search history.

(56) References Cited

U.S. PATENT DOCUMENTS

| | | | |
|---|---|---|---|
| 4,724,723 A * | 2/1988 | Lockhart et al. | 477/102 |
| 5,029,118 A | 7/1991 | Nakajima et al. | |
| 5,323,336 A | 6/1994 | Cage | |
| 5,573,476 A * | 11/1996 | Minowa et al. | 477/109 |
| 5,792,021 A * | 8/1998 | Minowa et al. | 477/106 |
| 6,090,011 A * | 7/2000 | Minowa et al. | 477/107 |
| 6,556,957 B1 | 4/2003 | Daumer | |
| 6,578,411 B2 | 6/2003 | Cheng | |
| 6,961,647 B2 * | 11/2005 | Matsumura et al. | 701/55 |
| 6,997,278 B2 * | 2/2006 | Fortune | 180/273 |
| 7,027,961 B2 | 4/2006 | Molenaar | |
| 7,239,984 B2 | 7/2007 | Moessner | |

(Continued)

FOREIGN PATENT DOCUMENTS

| | | | |
|---|---|---|---|
| JP | 4-246720 | * | 9/1992 |
| JP | 4-307169 | * | 11/1992 |

OTHER PUBLICATIONS

New skid avoidance method for electric vehicle with independently controlled 4 in-wheel motors; Sakai, S.; Sado, H.; Hori, Y. Industrial Electronics, 1999. ISIE '99. Proceedings of the IEEE International Symposium on; vol. 2; Digital Object Identifier: 10.1109/ISIE.1999. 798740; Pub. Yr: 1999, pp. 934-939 vol. 2.*

(Continued)

*Primary Examiner* — Cuong H Nguyen
(74) *Attorney, Agent, or Firm* — James Dottavio; Brooks Kushman P.C.

(57) ABSTRACT

A method for an automatic transmission includes measuring torque of a component of the transmission using a torque sensor in communication with the component. The torque of the component is estimated from information other than the measured torque. The measured torque is rejected from being used in a control operation of the transmission if the difference between the measured torque and the estimated torque is greater than a selected threshold.

13 Claims, 7 Drawing Sheets

(56) References Cited

U.S. PATENT DOCUMENTS

| | | | |
|---|---|---|---|
| 7,313,470 | B2 | 12/2007 | Zaremba et al. |
| 7,324,888 | B1 | 1/2008 | Stotsky |
| 7,672,814 | B1 | 3/2010 | Raanan et al. |
| 8,140,230 | B2* | 3/2012 | Haggerty et al. ............... 701/54 |
| 8,423,249 | B2* | 4/2013 | Poskie et al. .................... 701/51 |
| 2001/0049573 | A1* | 12/2001 | Ohashi et al. ................... 701/51 |
| 2003/0100985 | A1* | 5/2003 | Matsumura et al. ............ 701/55 |
| 2005/0061554 | A1* | 3/2005 | Fortune .......................... 177/144 |
| 2006/0100765 | A1* | 5/2006 | Matsubara et al. ............. 701/51 |
| 2006/0135316 | A1* | 6/2006 | Fujii et al. ...................... 477/156 |
| 2006/0225521 | A1* | 10/2006 | Von Beck et al. ........ 73/862.331 |
| 2007/0037660 | A1* | 2/2007 | Shishido et al. ................ 477/74 |
| 2008/0188973 | A1 | 8/2008 | Filev et al. |
| 2009/0013803 | A1* | 1/2009 | Lohr et al. ............... 73/862.338 |
| 2009/0312959 | A1* | 12/2009 | Borman .......................... 702/41 |
| 2010/0087996 | A1* | 4/2010 | Haggerty et al. ............... 701/58 |
| 2011/0264342 | A1* | 10/2011 | Baur et al. ...................... 701/54 |
| 2012/0130608 | A1* | 5/2012 | Fujii et al. ...................... 701/54 |
| 2012/0130610 | A1* | 5/2012 | Lee et al. ........................ 701/58 |
| 2012/0191308 | A1* | 7/2012 | Poskie et al. ................... 701/51 |

OTHER PUBLICATIONS

Torque Observers Design for Spark Ignition Engines With Different Intake Air Measurement Sensors; Munan Hong et al.; Control Systems Technology, IEEE Transactions on; vol. 19, Issue: 1; Digital Object Identifier: 10.1109/TCST.2010.2040620 Publication Year: 2011, pp. 229-237.*

A comparative study of field-oriented and direct-torque control of induction motors reference to shaft-sensorless control at low and zero-speed; Wolbank, T.M.; Moucka, A.; Machl, J.L.;Intelligent Control, 2002. Proc. of the 2002 IEEE Inter Symp on; Digital Object Id: 10.1109/ISIC.2002.1157795; Pub Year: 2002, pp. 391-396.*

Digital Measuring System for Monitoring Motor Shaft Parameters on Ships; Dzapo, H.; Stare, Z.; Bobanac, N.; Instrumentation and Measurement, IEEE Transactions on; vol. 58, Issue: 10; Digital Object Identifier: 10.1109/TIM.2009.2019316 Publication Year: 2009, pp. 3702-3712.*

Real-Time Estimation of Transmitted Torque on Each Clutch for Ground Vehicles With Dual Clutch Transmission; Oh, J.J.; Choi, S.B.; Mechatronics, IEEE/ASME Transactions on; vol. PP, Issue: 99; Digital Object Identifier: 10.1109/TMECH.2014.2307591 Publication Year: 2014, pp. 1-13.*

Fuzzy logic torque control strategy for parallel hybrid electric vehicles; Zhang Yi; Liu HePing; Fuzzy Systems and Knowledge Discovery (FSKD), 2011 Eighth International Conference on; vol. 1; Digital Object Identifier: 10.1109/FSKD.2011.6019610; Publication Year: 2011, pp. 640-644.*

In-vehicle data logging system for fatigue analysis of drive shaft; Ilic, S.; Katupitiya, J.; Tordon, M.; Robot Sensing, 2004. ROSE 2004. International Workshop on; Digital Object Identifier: 10.1109/ROSE.2004.1317610 Publication Year: 2004, pp. 30-34.*

Efficiency optimization of a direct torque controlled induction motor used in hybrid electric vehicles; Sergaki, E.S.; Moustaizis, S.D. Electrical Machines and Power Electronics and 2011 Electromotion Joint Conference (ACEMP), 2011 International Aegean Conf. ;Digital Obj Id: 10.1109/ACEMP.2011.6490631; Pub. Year: 2011, pp. 398-403.*

High-dynamic direct average torque control for switched reluctance drives; Inderka, R.B.; De Doncker, R.W.A.A. Industry Applications, IEEE Transactions on; vol. 39, Issue: 4; Digital Object Identifier: 10.1109/TIA.2003.814579 Publication Year: 2003, pp. 1040-1045.*

High precision sensor for dynamic torque; Yu XiaoYang; WangYan; Guo Hua; Wang Qishan; Vehicle Electronics Conference, 1999. (IVEC '99) Proceedings of the IEEE International; Digital Object Identifier: 10.1109/IVEC.1999.830653 Publication Year: 1999, pp. 163-165 vol. 1.*

Test and verification of a four-quadrant transducer for HEV applications; Nordlund, Erik; Eriksson, S. Vehicle Power and Propulsion, 2005 IEEE Conf.; Digital Object Identifier: 10.1109/VPPC.2005. 1554529; Publication Year: 2005.*

Torque Coordination Control During Mode Transition for a Series—Parallel Hybrid Electric Vehicle; Li Chen; Gang Xi; Jing Sun Vehicular Technology, IEEE Transactions on; vol. 61, Issue: 7; Digital Object Identifier: 10.1109/TVT.2012.2200305 Publication Year: 2012, pp. 2936-2949.*

* cited by examiner

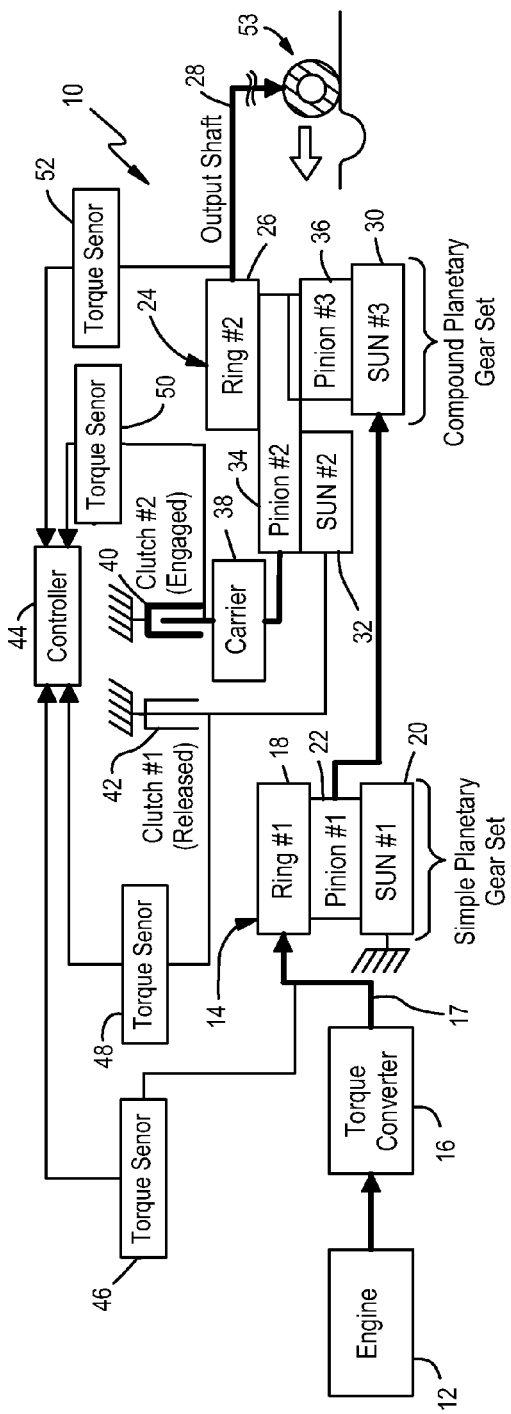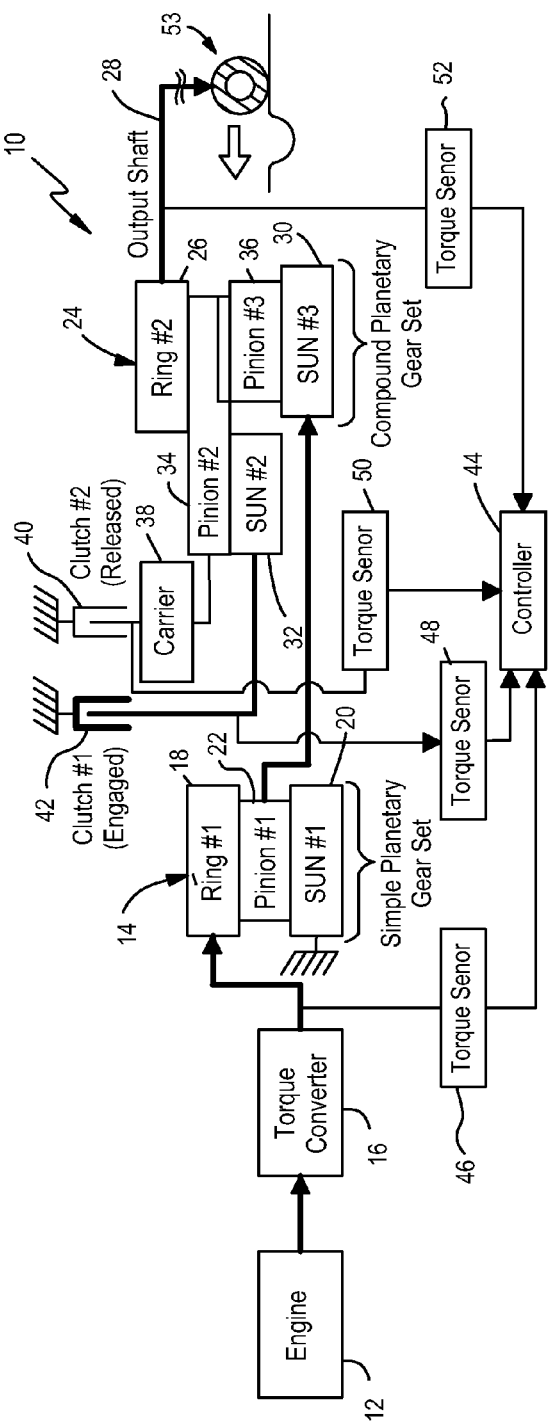
FIG. 1A
FIG. 1B

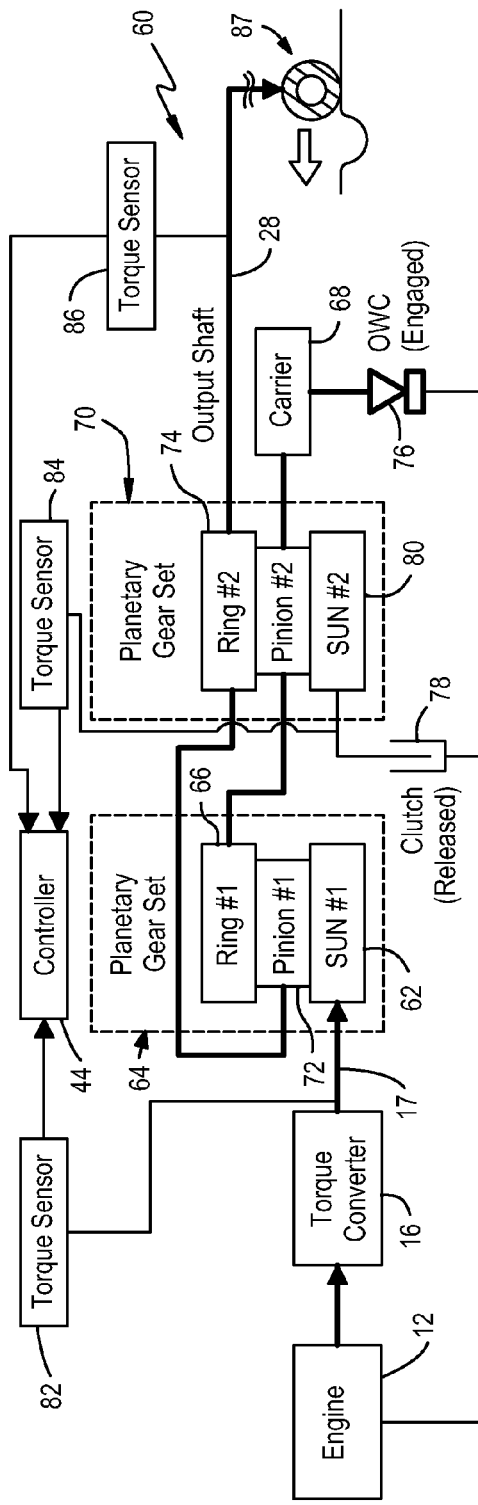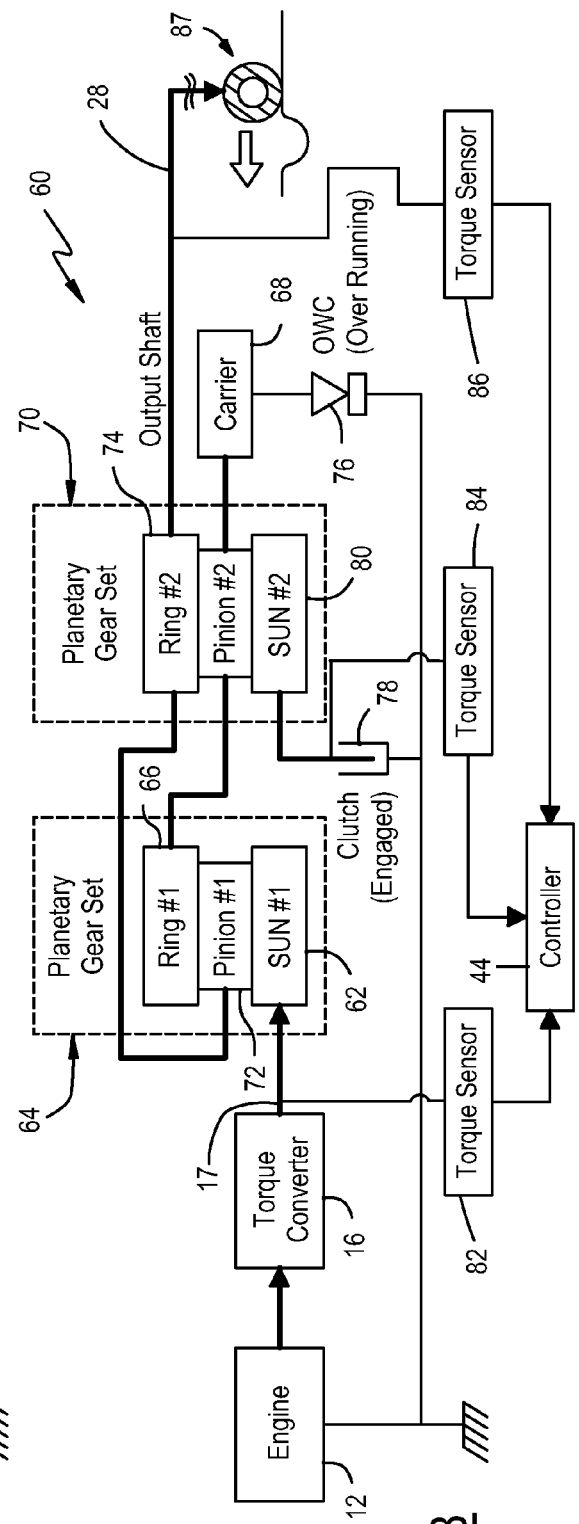
FIG. 2A
FIG. 2B

AUTOMATIC TRANSMISSION AND METHOD OF CONTROL FOR REJECTING ERRONEOUS TORQUE MEASUREMENTS

BACKGROUND

1. Technical Field

The present invention relates to automatic transmissions.

2. Background Art

An automatic transmission in an automotive vehicle power-train adjusts a gear ratio between a torque source and a driveshaft to meet drive-ability requirements under dynamically-changing driving conditions. The shifting of the transmission is accompanied by applying and/or releasing transmission friction elements (such as clutches, band-brakes, etc.) which change speed and torque relationships by altering planetary gear configurations. As a result, power flow paths are established and disestablished from an internal combustion engine to vehicle traction wheels.

The actuation of the friction elements has to be properly controlled in order to carry out the shifting of the transmission. For instance, during an up-shift event in a synchronous automatic transmission, the on-coming clutch ("OCC") engages as the off-going clutch ("OGC") releases. That is, as the torque transmitted through the OCC torque increases, the load exerted onto the OGC torque decreases due to a kinematic arrangement of gear sets. The release timing of the OGC has to be synchronized with a certain OCC torque level or else the shift quality may be inconsistent. Information regarding the operation of the transmission may be monitored and used to control the OCC and the OGC in order to carry out the shift event.

In general, monitored information regarding the operation of an automatic transmission may be used for the control of the power-train and the drive-train with the intent to, among other factors, improve drive-ability, shift quality, and fuel economy. Thus, it is desired that only the monitored information which is accurate is used for control operations.

SUMMARY

In at least one embodiment, a method is provided. The method includes measuring torque of a component of an automatic transmission using a torque sensor in communication with the component. The torque of the component is estimated from information other than the measured torque. The measured torque is rejected from being used in a control operation of the transmission if the difference between the measured torque and the estimated torque is greater than a selected threshold.

In at least one embodiment, an automatic transmission is provided. The transmission includes: an input shaft connectable to an engine via a torque converter; an output shaft; gearing defining multiple torque flow paths from the input shaft to the output shaft; and at least one clutch for shifting between gear configurations during a shift event. The transmission further includes a torque sensor in communication with a component of the transmission. The torque sensor is configured to measure torque of the component. The component is one of the input shaft, the output shaft, and the at least one clutch. The transmission further includes a controller in communication with the torque sensor. The controller is configured to estimate the torque of the component from information other than the measured torque and reject the measured torque from being used in a control operation of the transmission if the difference between the measured torque and the estimated torque is greater than a selected threshold.

BRIEF DESCRIPTION OF THE DRAWINGS

FIG. 1A illustrates a schematic representation of a multiple-ratio synchronous automatic transmission in accordance with an embodiment of the present invention in a low gear configuration;

FIG. 1B illustrates a schematic representation of the transmission shown in FIG. 1A in a high gear configuration;

FIG. 2A illustrates a schematic representation of a multiple-ratio non-synchronous automatic transmission in accordance with an embodiment of the present invention in a low gear configuration;

FIG. 2B illustrates a schematic representation of the transmission shown in FIG. 2A in a high gear configuration;

DETAILED DESCRIPTION

Figure 3:
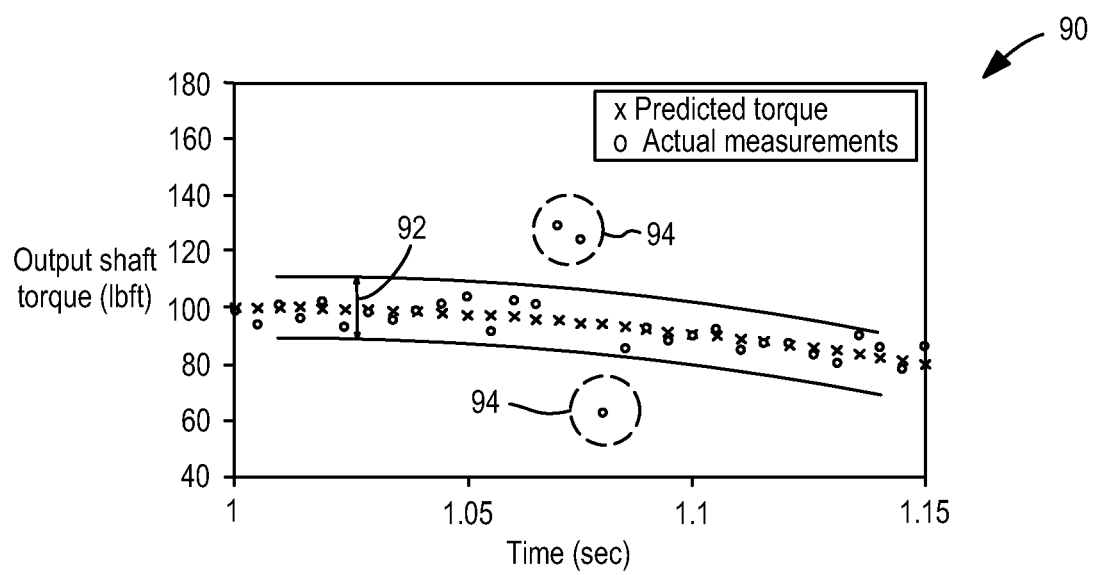
FIG. 3 illustrates a plot of an estimated (or predicted) transmission output torque profile generated by a method in accordance with an embodiment of the present invention.

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Referring now to FIGS. 1A and 1B, schematic representations of a multiple-ratio synchronous automatic transmission 10 in accordance with an embodiment of the present invention are shown. As explained in greater detail below, transmission 10 has a low gear configuration in FIG. 1A and a high gear configuration in FIG. 1B.

The power-train includes an internal combustion engine 12. The torque output side of engine 12 is hydro-kinetically coupled to a simple planetary gear set 14 of a multiple ratio transmission mechanism by a hydro-kinetic torque converter 16. Torque is delivered by a torque converter turbine via an input shaft 17 to ring gear 18 of gear set 14. Sun gear 20, which is grounded, acts as a reaction element as torque is delivered by a planetary carrier for pinions 22, which engage ring gear 14 and sun gear 20.

A compound planetary gear set 24 includes a ring gear 26, which is driveably connected to an output shaft 28. Sun gear 30 acts as a torque input element for gear set 24. A second sun gear 32 engages long planet pinions 34, which in turn engage ring gear 26 and short pinions 36. Sun gear 30 also engages pinions 36.

The pinions form a compound pinion assembly supported on carrier 38, which can be selectively braked by friction element 40, which is identified in FIGS. 1A and 1B as clutch #2 (i.e., off-going clutch ("OGC") 40). Sun gear 32 can be selectively braked by friction element 42, which is identified in FIGS. 1A and 1B as clutch #1 (i.e., on-coming clutch ("OCC") 42).

In the low gear configuration which is shown in FIG. 1A, OGC 40 acts as a reaction point for compound planetary gear set 24. The torque flow path in the power-train is indicated in FIG. 1A by heavy directional lines. Torque is delivered during low gear operation from simple gear set 14 to sun gear 30 of compound gear set 24. Ring gear 26 delivers driving torque to output shaft 28.

During an up-shift from the low to high gear configuration which is shown in FIG. 1B, OGC 40 is released and OCC 42 is applied. At this time, OCC 42 brakes sun gear 32. OCC 42 functions as a reaction point for compound gear set 24. During this up-shift, both the gear ratio (i.e., the transmission input shaft speed/the transmission output shaft speed) and the torque ratio (i.e., the transmission output shaft torque/the transmission input shaft torque) become lower.

Transmission 10 further includes torque sensors for monitoring torque (i.e., load) at various locations within the transmission. The torque sensors provide torque sensor signals indicative of the torque monitored by the torque sensors at the respective locations at current times to a controller 44. As explained below, controller 44 controls various transmission related functions based on the information of the torque sensor signals. In this embodiment, transmission 10 includes torque sensors 46, 48, 50, and 52 for respectively monitoring torque of input shaft 17, clutch 42, clutch 40, and output shaft 28.

Referring now to FIGS. 2A and 2B, schematic representations of a multiple-ratio non-synchronous automatic transmission 60 in accordance with an embodiment of the present invention are shown. Transmission 60 has a low gear configuration in FIG. 2A and a high gear configuration in FIG. 2B.

The power-train includes engine 12. Torque is delivered from engine 12 to torque converter 16. Turbine torque from torque converter 16 is delivered via input shaft 17 to sun gear 62 of a first planetary gear set 64. Ring gear 66 of first gear set 64 is driveably connected to carrier 68 of a second planetary gear set 70. Pinion carrier 72 of first gear set 64 is driveably connected to ring gear 74 of second gear set 70. Ring gear 74 is driveably connected to output shaft 28. Carrier 68 is braked in the configuration of FIG. 2A to a stationary element of the transmission by a one-way coupling ("OWC") or overrunning coupling 76. To up-shift from the low to high gear configuration, a clutch (e.g., an "OCC") 78 engages. This connects sun gear 80 of second gear set 70 to a stationary element of the transmission so that sun gear 80 acts as a reaction element. Carrier 68 no longer acts as a reaction element as OWC 76 is overrunning.

The various components of the gear sets can be connected to each other in various ways or held from turning depending on the state of clutches 76, 78 (as well as other not shown clutches). The ratio is obtained by the interconnection of the gear sets and in which components of the gear sets are held from turning. During a shift event, one or more of the clutches are in the process of being engaged or disengaged and the speed ratio of input shaft 17 to output shaft 28 usually varies between the two steady state ratio values that exist before and after the shift event.

In the low gear configuration which is shown in FIG. 2A, OCC 78 is released and OWC 76 is engaged (i.e., is in a locked position). By being engaged, OWC 76 effectively grounds carrier 68 of second gear set 70. The speed ratio of input shaft 17 to output shaft 28 is higher in the low gear configuration than in the high gear configuration. The torque flow path from input shaft 17 through the various gear sets to output shaft 28 is indicated in FIGS. 2A and 2B by heavy directional lines.

In order to change from the low to the high gear configuration which is shown in FIG. 2B, OCC 78 is engaged to ground sun gear 80 of second gear set 70. This has the effect of changing the torque path through the components of the gear sets. Each component experiences a different level of torque causing the various components to accelerate or decelerate. OWC 76 begins to overrun once the ratio change starts. Ultimately, after OCC 78 is fully engaged, the speed ratio of input shaft 17 to output shaft 28 becomes lower than in the low gear configuration. This shift needs to manage only one clutch (i.e., OCC 78) as the shift is a non-synchronous shift. As such, there is no synchronization between OCC 78 and another clutch such as an off-going clutch. In contrast, a synchronous shift, as described above, requires synchronization between an OCC and an OGC.

Like transmission 10, transmission 60 also includes torque sensors for monitoring torque at various locations within the transmission. As noted, controller 44 uses the torque sensor signals to effect control of various transmission related functions. In this embodiment, transmission 60 includes a torque sensor 82, 84, and 86 for respectively monitoring torque of input shaft 17, clutch 78, and output shaft 28.

Each torque sensor of transmissions 10 and 60 may be a strain-gauge base system, a force-resistive elastomer sensor, a piezoelectric load cell, or a magneto-elastic torque sensor. Preferably, at least input torque sensor 46 of transmission 10 and input torque sensor 82 of transmission 60 is each a magneto-elastic torque sensor as described in U.S. Pat. Nos. 6,145,387; 6,047,605; 6,553,847; and 6,490,934. Such magneto-elastic torque sensors enable accurate measurements of torque exerted onto a rotating shaft without requiring a physical contact between a magnetic flux sensing element and the shaft. Input torque sensors 46 and 82 can be positioned differently from that shown in FIGS. 1A and 1B and FIGS. 2A and 2B, depending on a kinematic arrangement and sensor packageability for a given transmission system in order to implement the present invention. Not all of the shown torque sensors are required and that additional torque sensors not shown may be added at other locations within the power-train and drive-train systems in accordance with the present invention.

Although the power-trains shown in FIGS. 1A and 1B and FIGS. 2A and 2B each includes a torque converter at the torque input side of transmissions 10 and 60, the present invention can be used as well in a hybrid power-train that includes, for example, an engine and an electric motor without a torque converter. In a hybrid configuration, the power of the engine is complemented by the power generated electrically by the motor. Further, the specific gearing arrangement illustrated in FIGS. 1A and 1B and FIGS. 2A and 2B can be replaced by other gearing arrangements that establish multiple torque flow paths from a power source (e.g., engine 12) to output shaft 28.

The above description of the up-shift event of transmissions 10 and 60 is intended to provide an example of the proper control of the friction elements that is required for a shift event. In general, the friction elements are controlled such that their torque levels are selectively changed over defined time periods in order to enable the shift event. As indicated, monitored information regarding the operation of transmissions 10 and 60 may be used to control the friction elements in order to properly carry out the shift event.

The torque sensors of transmissions 10 and 60 provide additional monitored information in the form of the torque sensor signals. As indicated above, the torque sensor signals are indicative of the torque at respective locations in transmissions 10 and 60. In accordance with the present invention, the torque sensor signals may be used by controller 44 or other vehicle controller to enhance power-train and drive-train control for improved drive-ability, shift quality, and fuel economy. In accordance with the present invention, torque measurements from the torque sensors can be obtained at a fine sampling time (e.g., a few mSec) to support open-loop, closed-loop, and adaptive control of power-train and drive-train systems.

However, a problem with using a torque measurement from a torque sensor to effect a control operation occurs when the torque measurement is not accurate (e.g. when the torque sensor signal is erroneous). An erroneous torque sensor signal, which may be referred to herein as an "outlier," is a torque measurement that is substantially affected by uncontrolled conditions or noise factors. For example, a torque measurement may be substantially affected by road surface roughness (generally indicated by reference numeral 53 in FIGS. 1A and 1B and by reference numeral 87 in FIGS. 2A and 2B) or noise originating from an electrical system. Erroneous torque sensor signals are inevitable in real-world applications. If not rejected, one or more erroneous torque sensor signals may result in unintended or undesirable power-train and drive-train control actions, thereby limiting the usefulness of the torque sensor signals.

An embodiment of the present invention provides a control method which identifies and rejects erroneous torque measurements from the torque sensors in real-time applications and prevents undesirable power-train and drive-train control actions. In general, the method includes constructing an estimated torque profile at a target location based on measured and calculated state variables and commanded control signals. The measured state variables do not include the measured torque sensor signal at the target location or at least do not include the measured torque sensor signal at the target location at the current time. The method further includes comparing the measured torque sensor signal at the target location at a given time with the estimated torque for the target location for the given time. If the torque sensor signal deviates from the estimated value by more than a selected threshold, then the method further includes identifying the torque sensor signal at the given time as an outlier, rejecting the torque sensor signal at the given time, and preventing undesirable power-train and drive-train control actions. If the torque sensor signal at the given time does not deviate from the estimated value by more than the selected threshold, then the method may further include using the torque sensor signal at the given time for a control operation.

The method is intended to provide a robust and systematic means to reject erroneous torque measurements within power-train and drive-train systems that are affected by various uncontrolled noise factors such as road surface conditions. As generally described, the method includes constructing an expected torque profile based on known state variables and control signals and conducting a simple test or statistically meaningful comparison against measured torque in real time. The method is intended to be a signal pre-processing method for enabling a practical use of torque measurements for robust power-train and drive-train control.

Referring now to FIG. 3, a plot 90 of an estimated (or predicted) transmission output torque profile generated by a method in accordance with an embodiment of the present invention is shown. The estimated transmission output torque profile represents the estimated output torque of output shaft 28 during a given operation over time. Output shaft 28 is one location where torque may be measured. As described above, torque may be measured at other locations. Accordingly, the estimated torque profile for each of these other locations would also be generated by the method if desired.

The method generates each estimated torque profile based on measured and estimated state variables (such as measured input shaft speed and calculated engine torque) and commanded control variables (such as clutch pressure). In general, each estimated torque profile can be made by any estimation method based on power-train and/or drive-train models.

In FIG. 3, the estimated transmission output torque values for respective times are shown in plot 90 with an "x" symbol. The measured transmission output torque values (e.g., the torque sensor signals from either torque sensor 52 of transmission 10 or torque sensor 86 of transmission 60) for the respective times are shown in plot 90 with an "o" symbol. The method selects an acceptance threshold or band 92 encompassing the estimated torque values. The method rejects those measured torque values which fall outside acceptance threshold 92 for the corresponding estimated torque values. Such rejected measured torque values are identified as being outliers 94 as shown in FIG. 3. Algorithms deployed by the method in rejecting erroneous measured torque values for real-time applications will be described below with reference to FIGS. 4, 5, 6, and 7. However, it is noted that, alternatively, a statistical decision making process may be employed in place of fixed threshold 92.

Figure 4:
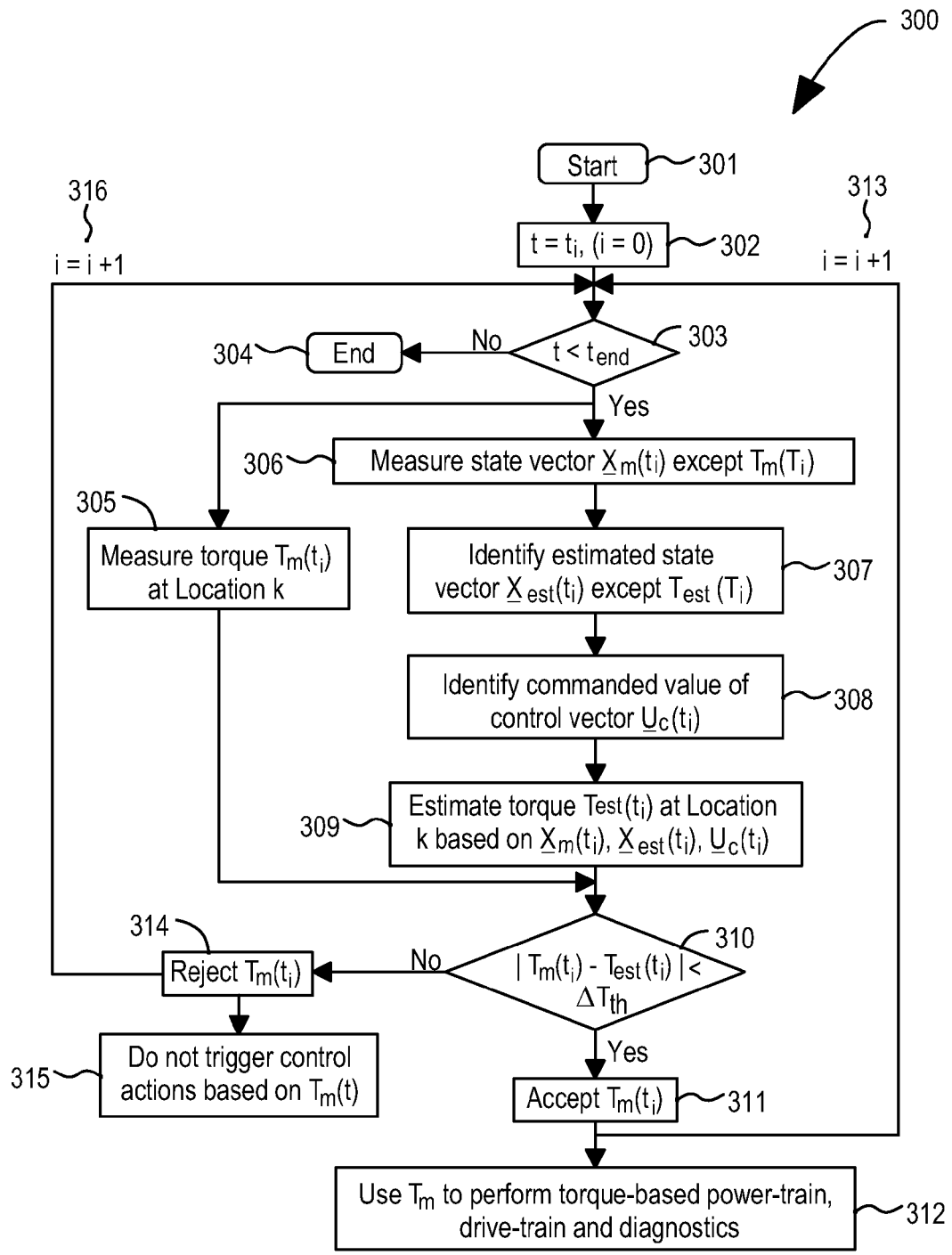
FIG. 4 illustrates a flowchart describing operation of the method.

Referring now to FIG. 4, a flowchart 300 describing operation of the method is shown. The operation is generally carried out by controller 44 and begins at block 301. Controller 44 first sets an internal timer t to $t_0$ at block 302. If t exceeds a chosen threshold $t_{end}$ at block 303, then controller 44 terminates the operation at block 304. If not, the operation proceeds to measuring actual torque at location k for the current time at block 305. That is, controller 44 receives the torque sensor signal from the torque sensor at location k for the current time at block 305. Concurrently with measuring the actual torque at location k, controller 44 gathers available state variables and commanded control variables at blocks 306, 307, and 308. A set of one or more variables is referred to as a vector (each vector indicated in the Figures is identified with an underline such as $X_m(t_i)$ in block 306 of FIG. 4, $X_{est}(t_i)$ in block 307 of FIG. 4, $U_c(t_i)$ in block 308 of FIG. 4, etc.). Such variables may include various speed measurements, calculated engine torque, and commanded clutch apply pressure. Such variables may also include information related to control stages or phases within a particular shift event. Based on the obtained variables, controller 44 calculates a predicted value of torque at location k for the current time based on, for example, a power-train and/or drive-train model at block 309. It is noted that the method does not rely on any specific process to calculate the predicted torque values.

At block 310, controller 44 compares the measured torque value for the current time against the predicted torque value for the current time. If the difference exceeds a selected threshold $\Delta T_{th}$, which is half the length of band 92, then controller 44 rejects the measured torque value as an outlier at block 314. In turn, controller 44 prevents any further power-train and/or drive-train control actions based on the rejected measured torque value at block 315. The operation returns to block 303 after controller 44 increments time counter at 316 for an iteration of a subsequent time.

Alternatively, if the measured torque value satisfies the acceptance criterion at block 310 (i.e., the difference between the measured torque value for the current time and the estimated torque value for the current time does not exceed the selected threshold $\Delta T_{th}$), then controller 44 accepts the measured torque value at block 311. In turn, controller 44 may use the accepted measured torque value for supporting further control and diagnostic actions at block 312. The operation returns to block 303 after controller 44 increments the time counter at 313 for an iteration of a subsequent time. At block 310, a statistical test may be employed instead of simply evaluating a difference between the predicted and measured values.

Figure 5:
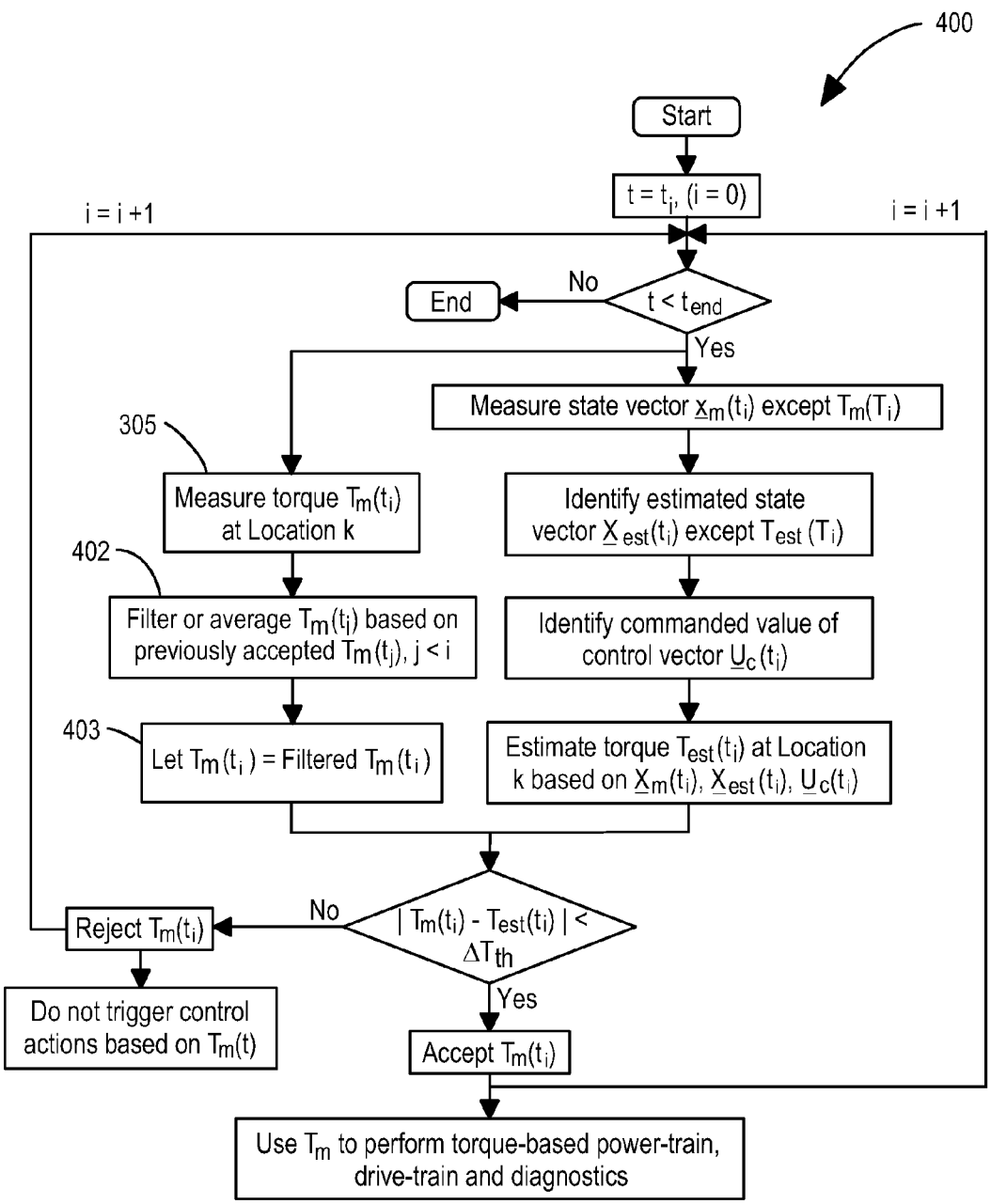
FIG. 5 illustrates a flowchart describing operation of the method pursuant to a first variant.

Referring now to FIG. 5, with continual reference to FIG. 4, a flowchart 400 describing operation of the method pursuant to a first variation is shown. In this variation, the operation as described in flowchart 300 of FIG. 4 further includes blocks 402 and 403 after block 305 as shown in flowchart 400 of FIG. 5. In operation, controller 44 records the measured torque value at the location k for the current time at block 305. Controller 44 then either digitally filters or averages the measured torque value at block 402. In averaging the measured torque value, controller 44 uses previously recorded torque measurements. At block 403, controller 44 replaces the measured torque value with the filtered or averaged torque value for subsequent operation steps.

Figure 6:
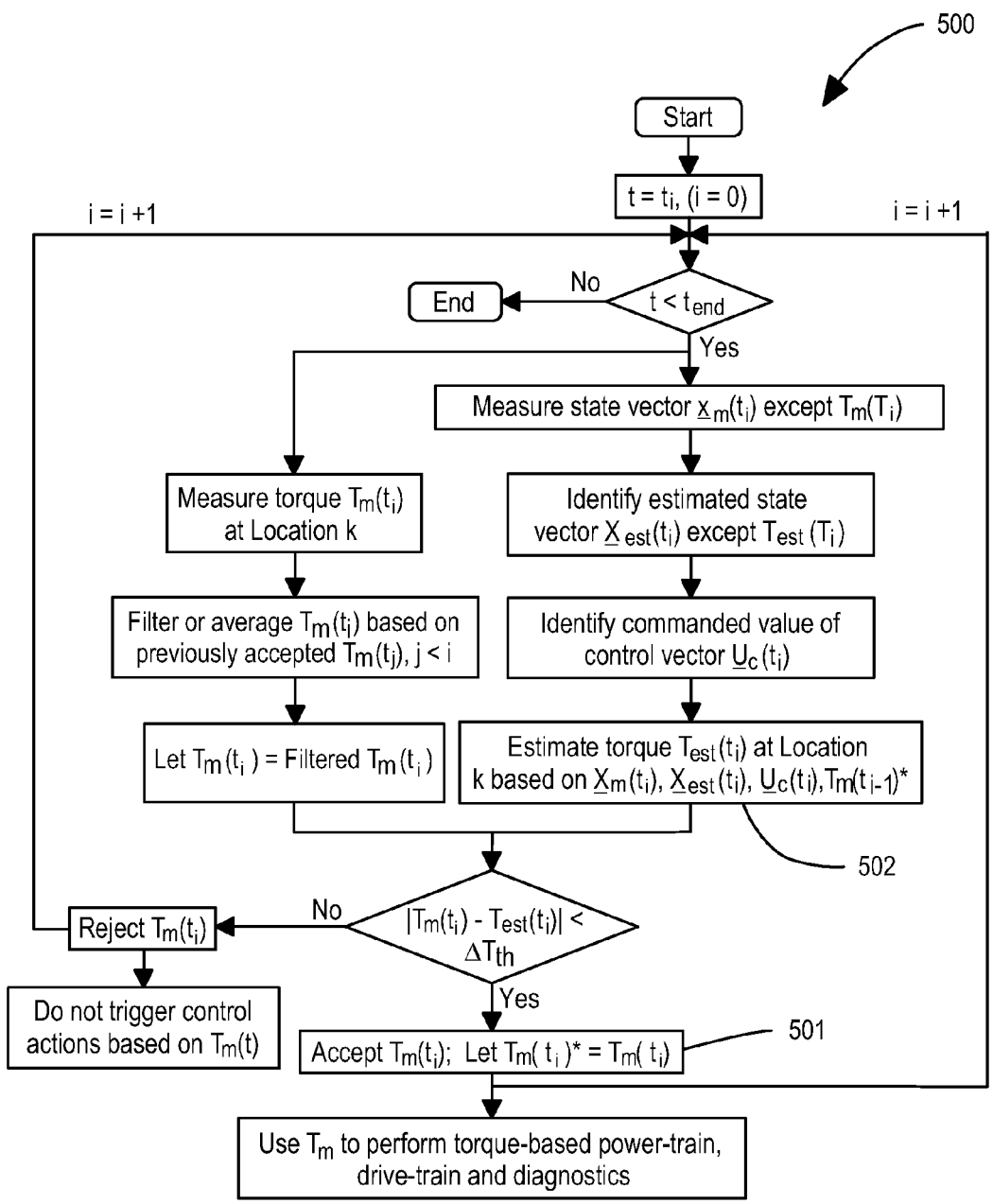
FIG. 6 illustrates a flowchart describing operation of the method pursuant to a second variant.

Referring now to FIG. 6, with continual reference to FIGS. 4 and 5, a flowchart 500 describing operation of the method pursuant to a second variation is shown. In this variation, the operation as described in flowchart 400 of FIG. 5 further includes block 501 and replaces block 309 of flowchart 300 of FIG. 4 with block 502. In operation, after controller 44 accepts a measured torque value for a current time (e.g., $T_m(T_i)$), the controller internally records the measured torque value $T_m(T_i)$ as "$T_m(T_i)$*" at block 501. At the subsequent time loop i+1, controller 44 uses the recorded $T_m(T_i)$* to calculate the estimated torque value ($T_e(t_{i+1})$) for the subsequent time at block 502.

Figure 7:
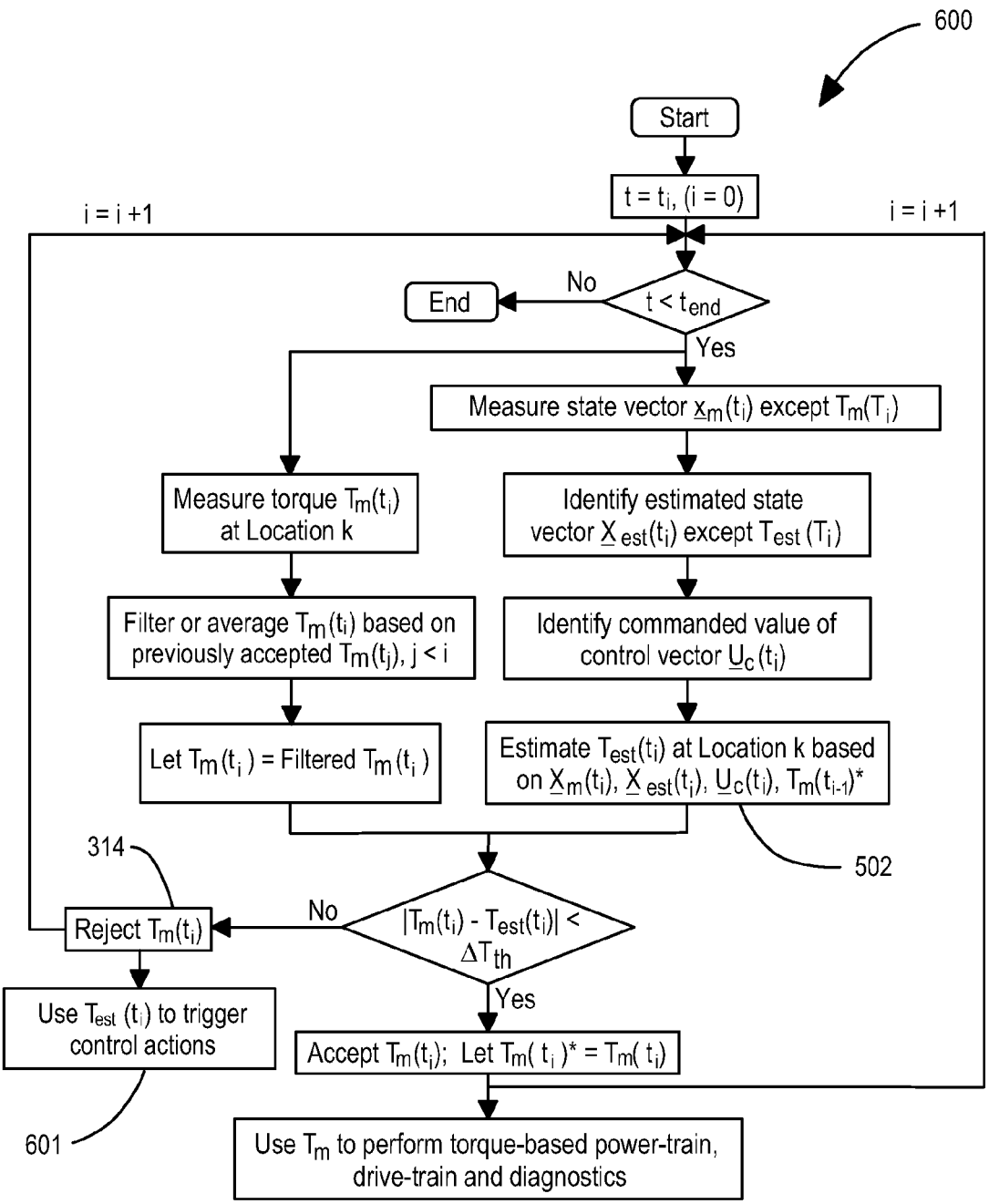
FIG. 7 illustrates a flowchart describing operation of the method pursuant to a third variant.

Referring now to FIG. 7, with continual reference to FIGS. 4, 5, and 6, a flowchart 600 describing operation of the method pursuant to a third variation is shown. In this variation, when controller 44 rejects the measured torque value $T_m(T_i)$ for the location k at the current time at block 314, the controller uses the estimated torque value ($T_{est}(T_i)$) for the current time (which was calculated in block 502) to trigger and support power-train and/or drive-train control actions at block 601.

Different aspects of any one or all of the variants may be combined to alter the operation of the method generally described in flowchart 300 of FIG. 4.

Flowcharts 300, 400, 500, and 600 represent control logic which may be implemented by controller 44 using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used.

The method is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence. The illustrated functions may be modified or in some cases omitted without departing from the spirit or scope of the present invention.

As described, embodiments of the present invention may have the following features and advantages. The methods in accordance with embodiments of the present invention may be applied to identify outliers in torque measurements at a chosen location in power-train and/or drive-train systems. The methods are designed to be executed in real-time on TCU. The methods reject outliers in torque measurements in power-train and/or drive-train systems with chosen criteria. A selected base criterion is a threshold for a difference between the measured and predicted values. Alternative criteria based on known statistical tests to statistically assess the distance between measured and predicted torque values can be included in the methods. The methods reject outliers to prevent undesirable power-train and/or drive-train control triggered by erroneous torque measurements. This feature may be used to detect the use of the methods through routine power-train and/or drive-train measurements in a vehicle. The methods enable the use of measured torque signals in real-time or adaptive power-train and/or drive-train control in real-world vehicle applications while reducing the occurrence of unintended control actions.

While embodiments of the present invention have been illustrated and described, it is not intended that these embodiments illustrate and describe all possible forms of the present invention. The words used in the specification are words of description rather than limitation, and various changes may be made without departing from the spirit and scope of the present invention.

What is claimed:

1. A method comprising:
    measuring torque of a shaft of a transmission at a current time using a magneto-elastic torque sensor located within the transmission at the shaft;
    estimating the torque of the shaft at the current time from information other than the measured torque; and
    rejecting the measured torque from being used in a control operation of the transmission if the difference between the measured torque and the estimated torque exceeds a selected threshold.

2. The method of claim 1 further comprising:
    using the measured torque in a control operation of the transmission if the difference between the measured torque and the estimated torque is less than the threshold.

3. The method of claim 1 further comprising:
    using the estimated torque in place of the measured torque in the control operation of the transmission if the measured torque is rejected.

4. The method of claim 1 further comprising:
    filtering the measured torque as a function of the measured torque of the shaft at a previous time to generate a filtered measured torque;
    wherein rejecting the measured torque includes rejecting the measured torque if the difference between the filtered measured torque and the estimated torque is greater than the threshold.

5. The method of claim 1 further comprising:
    measuring torque of a second shaft of the transmission using a second magneto-elastic torque sensor located at the second shaft;
    estimating the torque of the second shaft from information other than the measured torque of the second shaft; and rejecting the measured torque of the second shaft from being used in a control operation of the transmission if the difference between the measured torque of the second shaft and the estimated torque of the second shaft is greater than a second selected threshold.

6. The method of claim 1 wherein:
the shaft of the transmission is an input shaft.

7. The method of claim 1 wherein:
the shaft of the transmission is an output shaft.

8. The method of claim 1 wherein:
estimating the torque of the shaft at the current time includes estimating the torque of the shaft at the current time from information other than the measured torque at the current time and from information including the measured torque of the shaft at a previous time if the measured torque of the shaft at the previous time was not rejected.

9. An automatic transmission comprising:
an input shaft connectable to an engine via a torque converter;
an output shaft;
gearing defining multiple torque flow paths from the input shaft to the output shaft;
at least one clutch for shifting between gear configurations during a shift event;
a magneto-elastic torque sensor located downstream of the torque converter at the input shaft and configured to measure torque of the input shaft at a current time; and
a controller in communication with the torque sensor and configured to:
estimate the torque of the input shaft at the current time from information other than the measured torque; and
reject the measured torque from being used in a control operation of the transmission if the difference between the measured torque and the estimated torque is greater than a selected threshold.

10. The transmission of claim 9 wherein:
the controller is further configured to use the measured torque in a control operation of the transmission if the difference between the measured torque and the estimated torque is less than the threshold.

11. The transmission of claim 10 wherein:
the control operation entails controlling the at least one clutch to effect a shift event of the transmission.

12. The transmission of claim 9 further comprising:
a second magneto-elastic torque sensor located at the output shaft and configured to measure torque of the output shaft;
wherein the controller is in communication with the second torque sensor and is configured to:
estimate the torque of the output shaft from information other than the measured torque of the output shaft; and
reject the measured torque of the output shaft from being used in a control operation of the transmission if the difference between the measured torque of the second component and the estimated torque of the output shaft is greater than a second selected threshold.

13. The transmission of claim 9 wherein:
the controller is further configured to use the estimated torque in place of the measured torque in the control operation of the transmission if the measured torque is rejected.

\* \* \* \* \*